July 20, 1954  E. CUTSINGER ET AL  2,683,991
ENGINE STARTER WITH SLIDING CARRIER
Filed Sept. 28, 1950  2 Sheets-Sheet 1

Elic Cutsinger
Thomas F. Watson
INVENTORS

July 20, 1954   E. CUTSINGER ET AL   2,683,991
ENGINE STARTER WITH SLIDING CARRIER
Filed Sept. 28, 1950   2 Sheets-Sheet 2
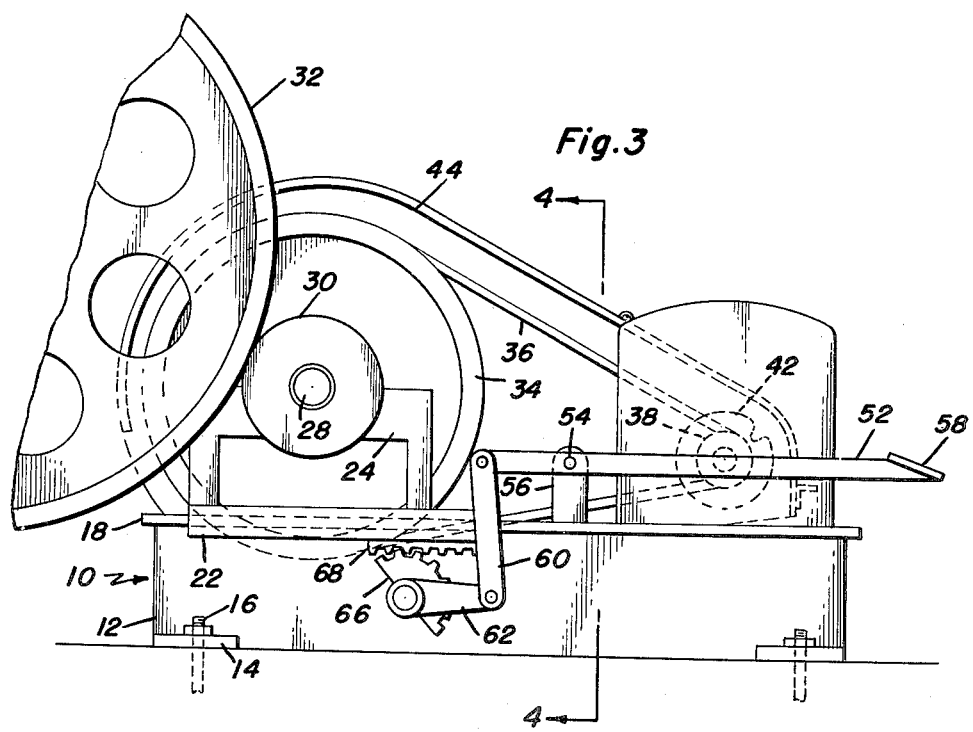
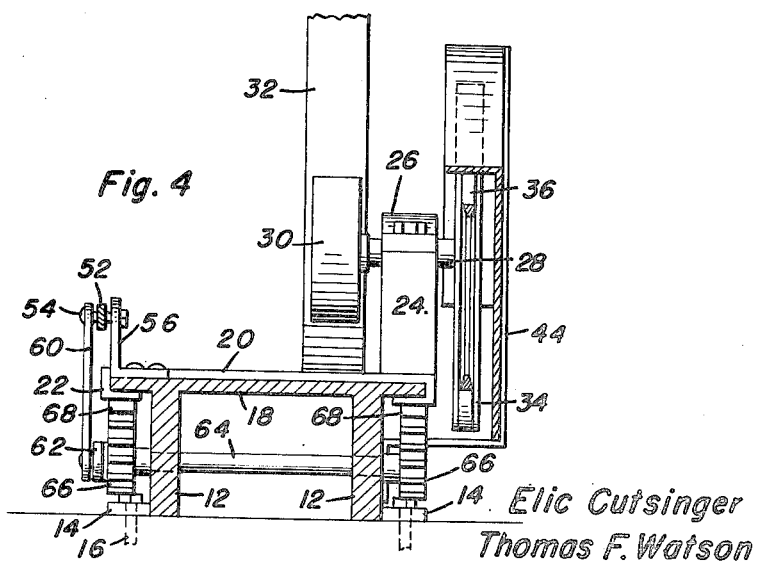
Elic Cutsinger
Thomas F. Watson
INVENTORS Patented July 20, 1954

2,683,991

UNITED STATES PATENT OFFICE 2,683,991

ENGINE STARTER WITH SLIDING CARRIER

Elic Cutsinger and Thomas F. Watson, Seminole, Okla., assignors, by mesne assignments, to Phillips Petroleum Company, Bartlesville, Okla., a corporation of Delaware Application September 28, 1950, Serial No. 187,260

6 Claims. (Cl. 74—8)

This invention relates to means for starting large engines such as those used for industrial purposes, the device having a friction pulley designed to contact the flywheel of the engine to be started.

A primary object of the invention is to provide an engine starter wherein the flywheel engaging friction pulley can conveniently be moved into operative engagement with the flywheel by depression of a foot lever, after the starting engine or other motor so used has been put in motion, whereby the convenience as well as the safety of operation is increased.

Another object of this invention is to provide a device of the character mentioned above wherein the friction pulley and the driven pulley connected therewith are both mounted on a sliding carrier plate so that the movement of this carrier plate brings the friction pulley into contact with the flywheel at or about the same time as the belt connecting said driven pulley with the drive pulley of the starting engine or motor is tightened, the structure being thereby simplified to a maximum degree without loss of efficiency.

Another object of a specific character is to provide a device of the character mentioned above wherein the sliding carrier plate is operated by a rack and segmented pinion assembly operated by a foot lever, all portions of the carrier plate operating means being mounted on a base which is fixed in position except for any necessary adjustments from time to time toward and away from the flywheel, this construction making it possible to remove the sliding carrier plate with the parts mounted directly thereon from the base, whenever this is desirable for purposes of repair or replacement of parts, and this construction also making it possible to use carrier plates with different sized friction pulleys and driven pulleys thereon with the same base, and otherwise facilitating the employment of the device and making the same more versatile in use.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 3 is a view similar to Figure 1 and showing the sliding carrier plate moved so as to carry the friction pulley into contact with the flywheel and to tighten the belt simultaneously;

Figure 4 is a transverse vertical sectional view taken substantially on the line 4—4 in Figure 3.

Similar characters of reference designate similar or identical elements and portions throughout the specification and throughout the different views in the drawings.

Figure 1:
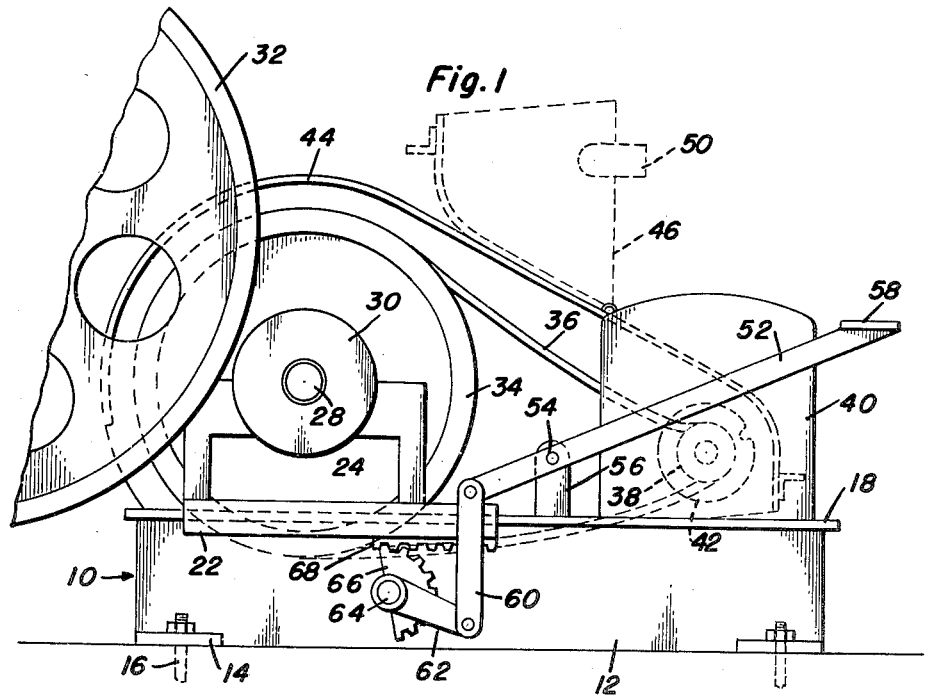
Figure 1 is a side elevational view of the engine starter, together with a fragmentary portion of a flywheel of an engine which is to be started.

Referring now to the drawings in detail, this invention includes a base 10 having a pair of parallel vertical supporting beams 12, which are provided with horizontal attachment flanges 14, provided with longitudinal slots to receive bolts 16, whereby the base is securable to a floor, the slots being elongated so that the base may be moved toward and away from the flywheel 32 of the engine to be started, whenever this may become necessary either in the original installation of the device or after a considerable period of use.

The base 10 also includes a top plate 18 which extends laterally of the beams 12 and which has slidingly mounted thereon, superficially thereof, a carrier plate 20. This carrier plate has shoes 22 comprising opposing channeled edge portions engaging lateral edge portions of the top plate 18, as best illustrated in Figure 4.

Figure 2:
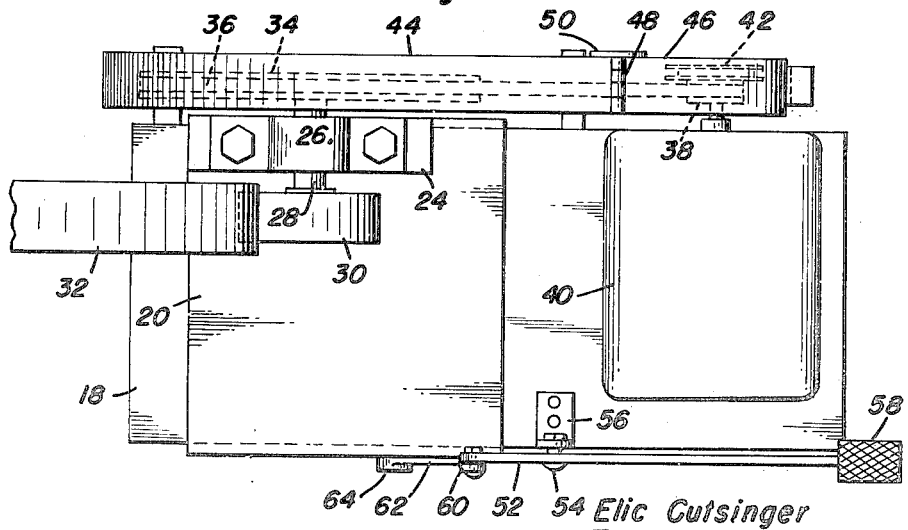
Figure 2 is a top plan view of the structure illustrated in Figure 1.

The carrier plate 20 has rigidly mounted on the upper side thereof a bearing member of pillow block character, indicated at 24, the bearing cap 26 being indicated in Figures 2 and 4 and a shaft 28 is mounted with an intermediate portion thereof freely rotatable in the bearing member, while one end of this shaft has rigidly secured thereto a friction pulley 30 adapted to engage the periphery of a flywheel 32 when the carrier plate 20 is one position. The other end of the shaft 28 has rigidly mounted thereon a driven pulley 34 which is connected by means of the belt 36 with a drive pulley 38 of a motor diagrammatically indicated at 40. This motor may be electric or may be a small internal combustion engine, in which case the starter pulley 42 for the same will be provided. A guard 44, constructed of sheet metal, will be provided to cover the driven pulley 34 and the drive pulley and starter pulley 38 and 42, as well as the belt 36, and it will be noted that a portion of the guard 44 is shiftable to allow access to the starter pulley 42, as indicated at 46, the portion 46 being hinged as indicated at 48 to the remaining portion of the guard 44. A spring latch 50 or other suitable latching means may be used to hold the portion 46 in closed position.

A foot lever 52 is pivoted as indicated at 54 upon an attaching bracket 56, the bracket being rigidly mounted on the base 10 and this foot lever has a pedal 58 at one end. The other end of the foot lever is pivotally connected to a link 60 which is also connected to an arm 62 rigidly fixed to a pinion segment shaft 64. The shaft 64 is mounted transversely of the base 10, beneath the carrier plate 20 and this shaft carries the pinion segment 66 which is in constant engagement with a rack 68 on the underside of each shoe 22. In other words, there are two racks 68 with coacting pinion segments 66, the latter being simultaneously operated by the shaft 64, so that no possible binding of the carrier plate is possible.

The operation of this invention will be clearly understood from a consideration of the foregoing description of the mechanical details thereof, taken in connection with the above recited objects and the drawings. In recapitulation, by way of further explanation, the starter motor 40 is first put in motion, either by the starter pulley 42 or otherwise, and then the foot lever is depressed to cause the carrier plate 20 to move the friction pulley 30 into contact with the flywheel 32 at the same time as the belt 36 is tightened so as to transmit power from the motor to the driven pulley 34. The belt 36 is slightly elastic.

Obviously minor changes may be made in the disclosed form of this invention without departing from the spirit thereof.

Having described the invention, what is claimed as new is:

1. An engine starter comprising a base, a motor on said base and having a drive pulley, a carrier plate slidably mounted on said base, a shaft mounted on said plate to move therewith, a driven pulley and a friction pulley fixed on said shaft, a belt connecting said drive pulley with said driven pulley, and means to slide said plate comprising a rack on said plate, a coacting pinion segment mounted for oscillation on said base, and a foot lever on said base and operatively connected to said pinion segment, said base having a top plate, said carrier plate having shoes slidably engaging said top plate, and said rack being on one of said shoes.

2. An engine starter comprising a base, a motor on said base and having a drive pulley, a carrier plate slidably mounted on said base, a shaft mounted on said plate to move therewith, a driven pulley and a friction pulley fixed on said shaft, a belt connecting said drive pulley with said driven pulley, and means to slide said plate comprising a rack on said plate, a coacting pinion segment mounted for oscillation on said base, and a foot lever on said base and operatively connected to said pinion segment, said base having a top plate, said carrier plate having shoes slidably engaging said top plate, and said rack being on one of said shoes, said shoes comprising opposed channelled edge portions of said carrier plate engaging lateral edge portions of the top plate, said rack being of those portions of the channelled edge portions beneath the top plate.

3. An engine starter comprising a base, a motor on said base and having a drive pulley, a carrier plate slidably mounted on said base, a first shaft mounted on said plate to move therewith, a driven pulley and a friction pulley fixed on said first shaft, a belt connecting said drive pulley with said driven pulley; and means to slide said plate comprising a pair of spaced racks on said plate, a second shaft rotatably journaled in said base, a pair of pinions rigidly secured to said shaft, each pinion being in mesh with one of said racks, a lever arm rigidly mounted on said second shaft, a foot lever pivoted on said base, and connecting means securing said foot lever to said lever arm.

4. A starter for an engine having a large flywheel, said starter comprising a base having a top lying in a plane below the center of said flywheel, a carrier plate supported over a large area on the top of said base and supporting a first shaft journaled thereon, a friction wheel rigidly mounted on said first shaft and slidable with said plate with the center of said friction wheel below the center of said flywheel into engagement with said flywheel, means to force said friction wheel into said engagement with a below center portion of said flywheel with a force sufficient to cause said friction wheel to drive said flywheel without slipping comprising a foot lever mounted on said base, a rack mounted on said plate, a second shaft rotatably mounted on said base, a pinion rigidly mounted on said second shaft and meshing with said rack, a mechanical linkage connecting said foot lever to said second shaft to rotate the same, a motor mounted on said base, and a flexible drive between said motor and said first shaft acting over the entire range of movement of said plate.

5. In the combination of claim 4, the plate being guided on the base by guide means comprising a pair of racks including the rack mentioned, there being a pair of pinions rigidly mounted on said shaft, said pair of pinions including the pinion mentioned, and said pinions engaging respectively with said racks.

6. In a starter for an engine having a large flywheel, in which there is a common base, a first shaft carrying said flywheel and a second prime mover shaft carrying a first belt pulley journalled on said base, a member movable relative to said base, a third shaft journalled on said member carrying a friction pulley disposed and adapted to engage said flywheel at one position of said movable member, said third shaft carrying a second belt pulley, and a belt engaging said belt pulleys in driving relationship, the improvement comprising mounting said member slideably in a first plane on said base so that the axis of said third shaft moves in a second plane parallel to said first plane and between said first plane and a third plane parallel to said first plane and containing the axis of said first shaft, and providing means to slide said movable member in and out of said position, said means comprising a pair of parallel, spaced, racks mounted on said member, a fourth shaft journalled on said base, a pair of pinions rigidly mounted on said fourth shaft each disposed in meshing engagement with one of said racks, and means to rotate said fourth shaft comprising an arm secured to said fourth shaft, a lever pivoted to said base, and a link connecting said arm and said lever.

References Cited in the file of this patent

UNITED STATES PATENTS

| Number | Name | Date |
|---|---|---|
| 1,311,003 | Michalicex | July 22, 1919 |
| 1,384,876 | Voss | July 19, 1921 |
| 1,619,389 | Winters | Mar. 1, 1927 |
| 1,866,322 | Rowe | July 5, 1932 |
| 2,521,319 | Armstrong | Sept. 5, 1950 |